United States Patent [19]

Bosch

[11] 4,215,882

[45] Aug. 5, 1980

[54] JOINT STRUCTURE

[75] Inventor: Toivo Bosch, Heidenheim, Fed. Rep. of Germany

[73] Assignee: J. M. Voith GmbH, Heidenheim, Fed. Rep. of Germany

[21] Appl. No.: 891,721

[22] Filed: Mar. 30, 1978

[30] Foreign Application Priority Data

Apr. 2, 1977 [DE] Fed. Rep. of Germany ....... 2714830

[51] Int. Cl.² .................. F16L 27/00; F16L 51/02
[52] U.S. Cl. ................................. 285/227; 285/301
[58] Field of Search ............. 285/228, 227, 226, 224, 285/223, 97, 299, 300, 301

[56] References Cited

U.S. PATENT DOCUMENTS

| | | | |
|---|---|---|---|
| 1,336,111 | 4/1920 | Ullrich | 285/226 |
| 1,475,288 | 11/1923 | Diescher | 285/97 X |
| 1,475,289 | 11/1923 | Diescher | 285/97 X |
| 2,014,355 | 9/1935 | Hussman | 285/299 X |
| 2,348,833 | 5/1944 | Miller | 285/228 |
| 3,695,637 | 10/1972 | Satterthwaite et al. | 285/97 |

FOREIGN PATENT DOCUMENTS

| | | | |
|---|---|---|---|
| 1332322 | 6/1963 | France | 285/299 |
| 258088 | 5/1949 | Switzerland | 285/228 |
| 1129611 | 10/1968 | United Kingdom . | |
| 1395789 | 5/1975 | United Kingdom | 285/227 |
| 371391 | 5/1973 | U.S.S.R. | 285/226 |

*Primary Examiner*—Thomas F. Callaghan
*Attorney, Agent, or Firm*—Lon H. Romanski

[57] ABSTRACT

A first pipe or shaft-like structure having a first end is shown operatively connected to a second pipe or shaft-like structure having a second end in a manner whereby the first and second ends spaced from each other and in fluid communication with each other; a coupling apparatus or joint structure operatively interconnects the first and second pipes; the joint structure employs liquid filled resiliently deflectable first and second force transmitting members as inner connections respectively functionally interconnecting a rigid portion of the joint structure to a rigid portion of the first pipe and to a rigid portion of the second pipe.

8 Claims, 2 Drawing Figures

JOINT STRUCTURE

BACKGROUND OF THE INVENTION

Generally, as is well known in the art or technique of shelf drilling for gas and/or oil, riser lines are employed with such riser lines being usually comprised of a plurality of sections or lengths of generally rigid pipe interconnected in end-to-end relationship. Also as is generally well known, such riser lines are usually subjected to great stresses and loads occassioned as by bending moments or force couples applied thereto.

Accordingly, the prior art has, heretofore, attempted to provide articulated connections instead of rigid joints as between succeeding pipe sections forming the riser line in order to achieve a reduction in the bending moments otherwise experienced by such a riser line. Specifically, heretofore, the prior art has suggested the use of ball and socket type joints or rubber (or rubber-like) rings for such articulated connections. Such prior art devices have not been found to be satisfactory. For example, among other problems, ball and socket joints exhibit a significant degree of friction which, in turn, causes abrupt stresses to occur often resulting in damage to the related pipe and overall riser line. Even though the use of prior art intermediate members consisting of rubber (or similar material) rings has the advantage of exhibiting only a comparatively slight degree of friction, such prior art rubber ring members are not capable of carrying loads of a magnitude sufficiently great to make such prior art rubber rings totally satisfactory.

Accordingly, the invention as herein disclosed and claimed is primarily directed to the solution of the foregoing and other attendant or related problems.

SUMMARY OF THE INVENTION

According to the invention apparatus for connecting one end of one pipe to the adjacent end of an other pipe comprises an intermediate connector which, in turn, comprises a resiliently deflectable liquid filled force transmitting unit which, at one functional end, is operatively connected to the one end of the one pipe and which, at its other functional end, is operatively connected to the said adjacent end of said other pipe.

In one aspect of the invention, there may be a set of resiliently deflectable liquid filled force transmitting units with a first of such set having one functional end thereof operatively connected to the one end of the one pipe and the second of such set having one functional end thereof operatively connected to the said adjacent end of the said other pipe, and the respective opposite functional ends of the first and second of said set being operatively connected to each other.

In another aspect of the invention, the liquid filled force transmitting unit may comprise a cooperating set of resilient elements which form between them an annular chamber containing the liquid thereby allowing the joint to flex while displacing liquid from one part of the chamber to another portion of the same chamber. Accordingly, in riser line applications, the initial tension force resulting from the weight of the segmented parts of the riser line, themselves, is taken up and transmitted by the said liquid filled chamber. The elements forming the chamber walls are made resilient and therefore can yield together with the liquid when a force acts generally laterally on the joint thereby precluding the transmission of bending moments. In this aspect of the invention, the volume of such a liquid filled chamber, as a whole, remains constant making it possible to have angular movements as between, for example, two functionally adjacent pipes.

In another aspect of the invention there may be an elongate tube and two sets of resilient elements, each set forming therebetween an annular chamber containing liquid, one set extending from one end of the tube back inside the tube and the other set extending from the other end of the tube back inside the tube, so that in use the two sets can be respectively connected to the two ends of a pair of pipes to be interconnected, there being a gap between the ends of the two pipes which is shorter than the length of the tube, the tube surrounding the pipe ends and the apparatus including a resilient seal for sealing the gap between the ends of the two pipes. In this way satisfactory and reliable force transmission is achieved. Because of the interposition of the tube the resilient elements are subjected to compressive but not to tensile stress. The resilient seal seals the interior of the pipes, in which washing liquid runs, against water surrounding the riser lines. However this seal does not have to transmit any force.

In another aspect of the invention, each set of resilient elements may comprise a pair of concertina-like bellows arranged concentrically one inside the other. In use these bellows extend around the pipe ends. These bellows form between them the chamber filled with liquid and are sufficiently resilient to permit angular movements to a sufficient extent.

In yet another aspect of the invention, each pair of bellows may have a pair of sleeves or extensions arranged in the annular space between the bellows, the two sleeves extending towards one another from opposite ends of the bellows such that the rims of the sleeves face one another a slight distance apart, so that if the bellows should leak and start to collapse, the two rims come into abutment with each other. This expedient constitutes a safety arrangement. If for instance one of the bellows does become leaky, the sleeves opposite to one another rest one upon the other. This admittedly reduces or eliminates the articulation effect of the joint, but the riser line does not have to be dismantled because of this.

In still another aspect of the invention, each set of resilient elements each comprises a plurality of pressure cushions which are spaced apart in the axial direction and separated from one another by intermediate rings, an inner chamber of each pressure cushion being filled with liquid. This construction achieves the result that if one pressure cushion fails because of leaks, the articulation effect is essentially still present. The possible angular movements become increasingly smaller only if a plurality of pressure cushions have failed.

In a further aspect of the invention, the pressure cushions are formed of resiliently deflectable steel. Also, the overall angular mobility of the joint structure is further increased by having the intermediate rings also formed of resilient material.

In one particular embodiment of the invention, to enable the pressure cushions to be filled with liquid in a simple way, a bore is formed in each pressure cushion with such bore, in turn, registering with a bore or passage in an adjacent intermediate ring. Upon completion of filling, the bores in the intermediate rings can then be closed.

The joint structure or connection according to the invention utilizing pressure cushions is especially suitable for compensation for deformations in heavily loaded bearing systems, as for example, step bearings of machines.

Other general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted.

DETAILED DESCRIPTION OF THE PREFERRED EMBODIMENT

Figure 1:
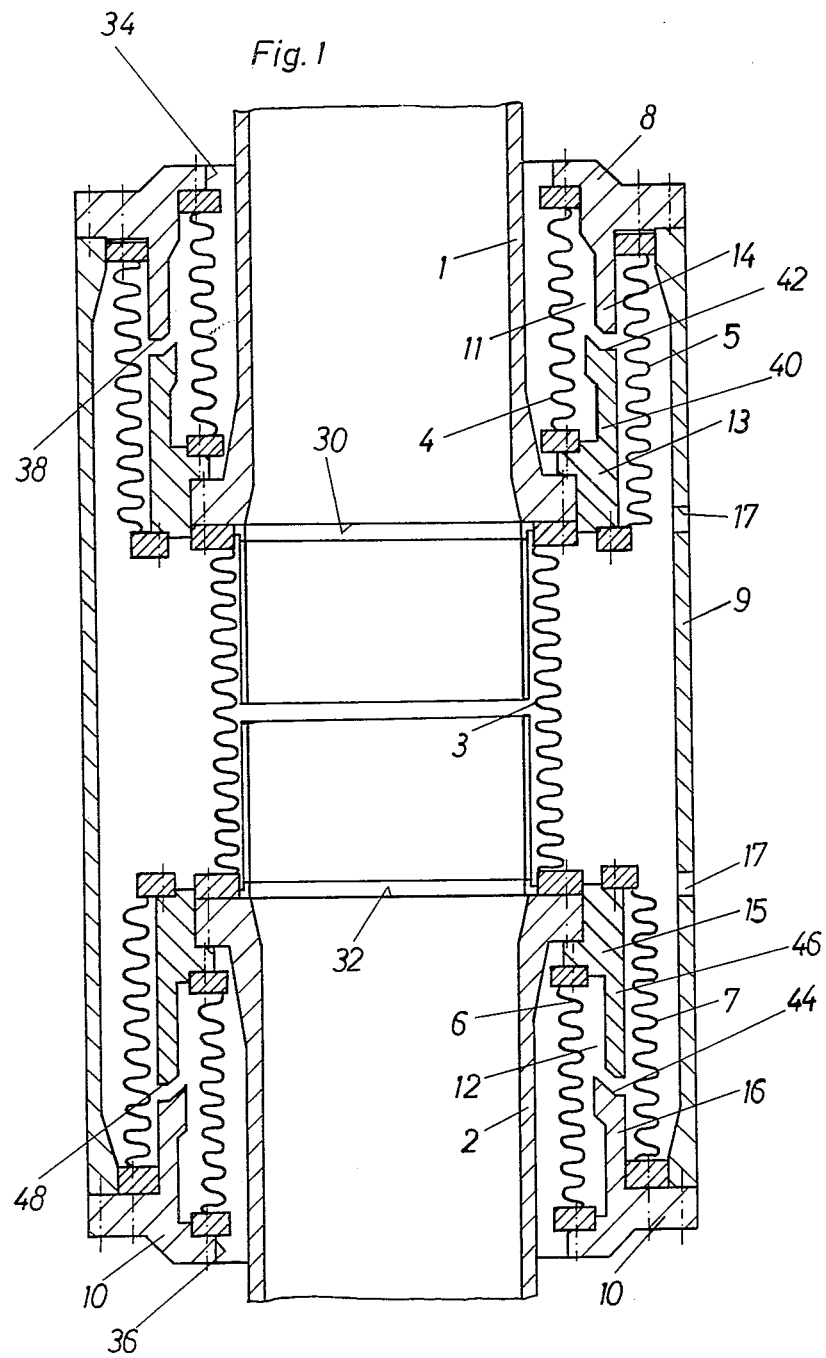
FIG. 1 is a longitudinal cross-section view through a joint structure embodying teachings of the invention.

Referring now in greater detail to the drawings, FIG. 1 illustrates a fragmentary portion of a first pipe or conduit 1 and a fragmentary portion of a second pipe or conduit 2 which are generally serially arranged with respect to each other as to have end 30 of pipe 1 generally juxtaposed to and spaced from end 32 of pipe 2. A generally tubular convoluted resiliently deflectable bellows seal 3 is situated between ends 30 and 32 and has its opposite axial ends respectively sealingly secured to ends 30 and 32 of pipes 1 and 2 as to thereby, sealingly, bring the interior of pipe 1 into communication with the interior of pipe 2.

A generally tubular-like housing, axially longer than the distance between ends 30 and 32 of pipes 1 and 2, generally surrounds the pipe ends 30 and 32 and extends some distance axially along such respective pipes 1 and 2. The tubular-like housing or cage is illustrated as comprising a generally tubular member 9 and generally annular oppositely situated end portions 8 and 10 which, as depicted, may be separate end members fixedly secured to cooperating juxtaposed ends of tubular member 9. As shown, ends 8 and 10 are provided with respective clearance-like apertures or passages 34 and 36 which are significantly larger than the respective outer diameters of pipes 1 and 2.

A first pair of seals 4 and 5, each of which is preferably of a configuration as that of a generally tubular convoluted deflectable bellows, is situated generally about pipe 1 and, generally surrounding the end of pipe 1. As depicted, the seals 4 and 5 are radially inwardly of housing section 9. The effective diameter of bellows seal 4 is substantially less than the effective diameter of bellows seal 5 thereby defining a generally annular space or chamber therebetween. Respective first ends of bellows seals 4 and 5 are sealingly fixedly secured as to annular end member of portion 8 while the respective opposite second ends of bellows seals 4 and 5 are effectively sealingly secured to the end 30 of pipe 1 as through an intermediate flange or mounting member 13. Accordingly, it can be seen that the bellows seals 4 and 5, mounted and sealingly secured as described and depicted define a sealed annular chamber 11 generally therebetween; chamber 11 is, in turn, completely filled as with a suitable liquid.

A second pair of seals 6 and 7, each of which is preferably of a configuration as that of a generally tubular convoluted deflectable bellows, is situated generally about pipe 2 and, generally, surrounding the end of pipe 2. As depicted, the seals 6 and 7 are radially inwardly of housing section 9. The effective diameter of bellows seal 6 is substantially less than the effective diameter of bellows seal 7 thereby defining a generally annular space or chamber therebetween. Respective first ends of bellows seals 6 and 7 are sealingly fixedly secured as to annular end member or portion 10 while the opposite second ends of bellows seals 6 and 7 are effectively sealingly secured to the end of pipe 2 as through an intermediate flange or mounting member 15. Accordingly, it can be seen that the bellows seals 6 and 7, mounted and sealingly secured as described and depicted define a sealed annular chamber 12 generally therebetween; chamber 12 is, in turn, completely filled as with a suitable liquid. Preferably, in each pair of said bellows seals, the bellows seals are arranged concentrically with respect to each other. Preferably bellows seals 4, 5, 6 and 7 are comprised of resiliently deflectable metal such as, for example, resiliently deflectable steel.

In the preferred embodiment, end portion 8 carries a general axial extension 14 which, in the preferred embodiment, is of a sleeve-like or tubular configuration having an open or projecting end surface 38. Further, in the preferred embodiment and as illustrated, extension 14 is formed integrally with end portion 8 and extends within chamber or space 11.

Also in the preferred embodiment, flange portion 13 carries a general axial extension 40 which, in the preferred embodiment, is of a sleeve-like or tubular configuration having an open or projecting end surface 42. Further, in the preferred embodiment and as illustrated, extension 40 is formed integrally with flange or mounting portion 13 and extends within chamber or space 11. As depicted, normally the juxtaposed end or projecting surfaces 38 and 42 are axially spaced from each other.

Similarly, in the preferred embodiment, end portion 10 carries a general axial extension 16 which, in the preferred embodiment, is of a sleeve-like or tubular configuration having an open or projecting end surface 44. Preferably, extension 16 is formed integrally with end portion 10 and extends within chamber or space 12. Further, in the preferred embodiment, flange or mounting portion 15 carries a general axial extension 46 which, preferably, is of a sleeve-like or tubular configuration having an open or projecting end surface 48. Also, as illustrated, preferably extension 46 is formed integrally with flange or mounting portion 15 and extends within chamber or space 12. As depicted, normally the juxtaposed end or projecting surfaces 44 and 48 are axially spaced from each other.

As should now be apparent, during normal operation with chambers 11 and 12 being filled, forces applied as to pipe 1 are transmitted through: liquid filled chamber 11; housing or cage means comprised of end 8, tubular member 9 and end 10; liquid filled chamber 12 and to pipe 2. The same applies if the forces applied are due to, for example, the weight of pipe 2 being transmitted to pipe 1.

If uneven or generally angular or lateral stresses, loads or forces are applied to either pipes 1 or 2 or the joint structure, the joint structure or coupling apparatus of FIG. 1 permits relative angular movements of pipes 1 and/or 2 (and seal 3) because of the first pair of deflectable bellows 4 and 5 and liquid filled chamber 11 defined thereby, and because of the second pair of deflectable bellows 6 and 7 and liquid filled chamber 12 defined thereby. Accordingly, as should now be apparent, any bending moments or other force couples applied to either pipe 1 or 2 do not have to be accommodated by the other pipe.

In the event any of seals 4, 5, 6 or 7 should experience a failure in the form of leakage of fluid from chambers 11 or 12, the cooperating sleeves or extensions 14 and 40 or 16 and 46 are effective for transmitting loads or forces therethrough. More specifically, and by way of example, if, because of leakage in seal 5, liquid escapes from chamber 11 any load applied by, for example pipe 1 to pipe 2, will cause juxtaposed surfaces 38 and 42 (normally spaced from each other) to abut against each other and thereby transmit loads or forces as, in the assumed condition, from extension 14 to extension 40 and to pipe 1. As should be apparent, the same applies to normally spaced juxtaposed surfaces 48 and 44 upon liquid leakage occurring from chamber 12.

In order to assure equalization of pressures with regard to the coupling apparatus of FIG. 1, apertures or porting means 17 are formed, preferably, through the wall of tubular housing section 9. This obviously, insures that the inner pressure is equal to the outer pressure and thereby guarantees that bellows seals 5 and 7 are referenced to the same pressure as are bellows seals 4 and 6.

Figure 2:
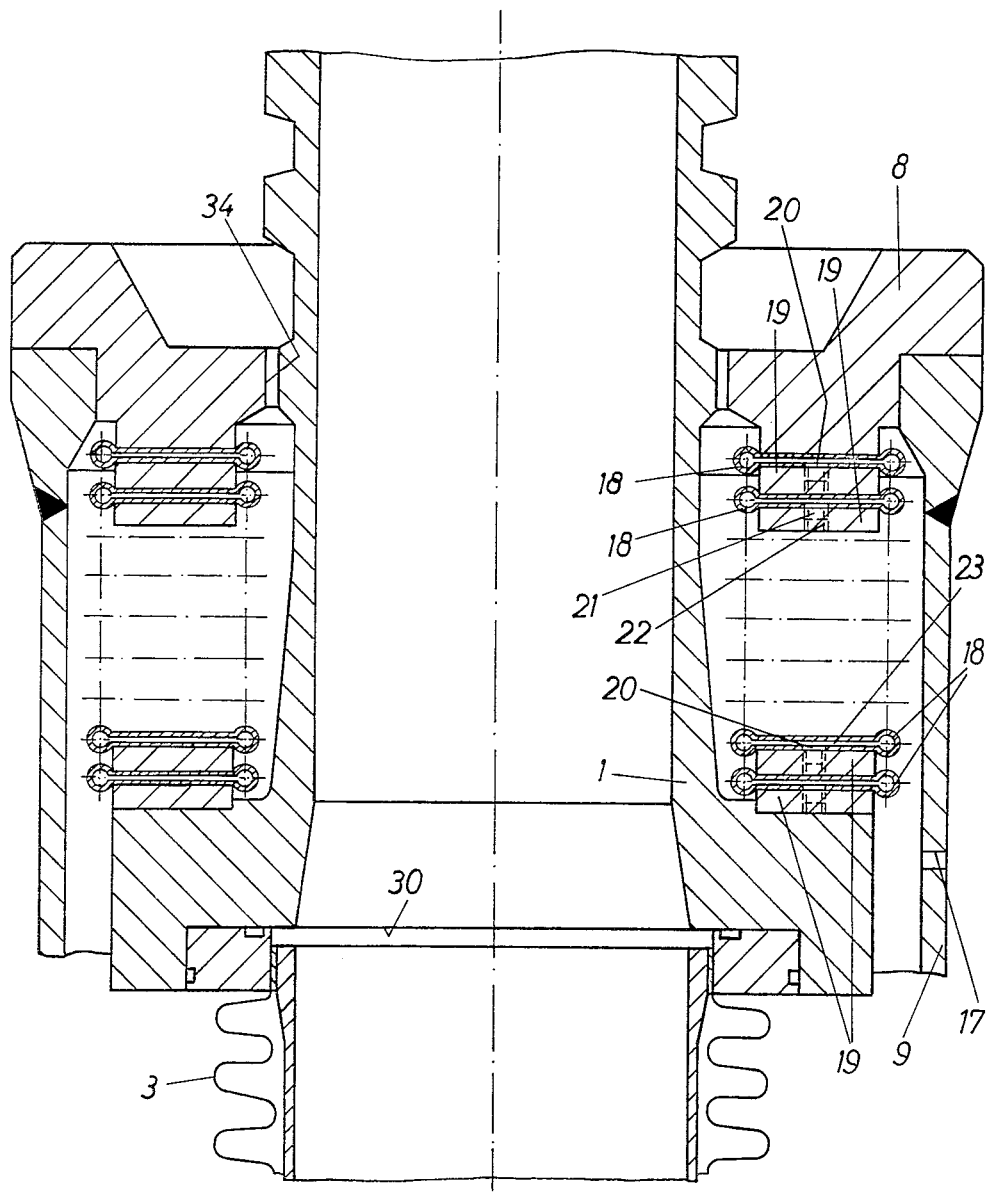
FIG. 2 is a longitudinal cross-sectional view through an alternate embodiment of a joint structure embodying teachings of the invention with fragmentary portions thereof broken away.

FIG. 2 illustrates another embodiment of the invention. Instead of illustrating both operatively connected pipes and the entire joint or coupling apparatus, only one pipe (as the relatively upper one) and that portion of the joint structure cooperating therewith are shown; the remaining or lower portion of the embodiment may be considered as a mirror image of the portion of the embodiment shown. Except as otherwise noted, in FIG. 2 elements which are like or functionally similar to those of FIG. 1 are identified with like reference numbers.

Referring in greater detail to the embodiment of FIG. 2, it can be seen that the arrangement disclosed is structurally and functionally similar to the embodiment of the invention disclosed in FIG. 1. Principally, the structure of FIG. 2 departs from that of FIG. 1 in that in FIG. 2 the structure employs a plurality of what may be referred to as pressure cushions or members 18. Each of such pressure cushions or members 18 is resiliently deflectable and preferably of a closed annular configuration defining an annular chamber 23 which is filled with a suitable liquid. As depicted, members 18 (only four of which are shown) are spaced from each other and circumscribe the pipe 1 in a manner as to be radially outward of the pipe 1 and radially inward of the housing section 9. The pressure or force transmitting members 18 are spaced from each other as by respective intermediate spacer rings 19 which also generally surround the pipe 1.

To enable the pressure cushions 18 to be filled with liquid during assembly, they are each provided with a bore or passage 20 which registers with a bore or passage 21 formed in the juxtaposed associated intermediate ring or pad 19. After the chamber 23 of a pressure cushion 18 has been sufficiently filled with liquid, the bore 21 in the associated intermediate ring 19 may be closed as by means of, for example, a threaded plug.

In the preferred form of the embodiment of FIG. 2, pressure cushions or members 18 are formed of resilient metal, such as resilient steel, so that such can undergo resilient deflection when, for example, uneven, angular or generally transverse loads or forces are applied as to pipe 1. When such occurs, there will be a relative angular movement as between the pipe 1 and adjacent portion of the coupling or joint structure. By having the pressure cushions 18 resiliently deflectable, such pressure cushions 18 can then conform to the experienced inclination and in so doing also displace a portion of the fluid from one particular area or portion of a chamber 23 to another area or portion of that same chamber. Further, in the preferred form of the embodiment of FIG. 2, the intermediate rings 19 are also made of resiliently deflectable material.

In addition to the benefits already set forth and as are also obvious in view of the disclosure, it should be pointed out that joint or coupling structures of the invention can sustain and accommodate very high pressures and, at the same time, substantially reduce if not actually totally eliminate the transmission of bending moments from one pipe to the next operatively connected succeeding pipe. As a direct consequence, the wall thicknesses of pipes, with which the invention is employed, may be significantly reduced from what would otherwise be required in order to sustain transmitted force couples as experienced by the prior art.

It should also be pointed out that even though the problem (the solution of which gave rise to the invention) resided in pipe systems as within a riser line for use in the technique of shelf drilling, where a plurality of pipes are interconnected and extending generally vertically upwardly, the invention is not so limited and it may be equally well practiced where any two shaft structures or pipes (whether upwardly, horizontally or otherwise extending) are to be operatively joined together and where it is desired that lateral, angular or oblique forces applied to one of such shaft structures or pipes not be transmitted to the other shaft structure or pipe in a manner which would result in damage or failure to the related system or apparatus.

Although only a preferred and one alternate embodiment of the invention have been disclosed and described, it is apparent that other embodiments and modifications of the invention are possible within the scope of the appended claims.

What is claimed is:

1. A joint structure for interconnecting one end of a first pipe to the adjacent end of a second pipe, comprising intermediate connector means, said intermediate connector means comprising a plurality of resiliently deflectable liquid filled force transmitting units, each of said force transmitting units having first and second functional ends, said first functional ends being operatively connected to said one end of said first pipe and said second functional ends being operatively connected to said adjacent end of said second pipe, said resiliently deflectable liquid filled force transmitting units being effective to undergo resilient deflection thereby allowing said first and second pipes to undergo angular motion with respect to each other, each of said units comprises an annular pressure cushion, said annular pressure cushions being axially spaced from each other, a plurality of intermediate spacer rings, said spacer rings being interleaved between adjacent ones of said annular pressure cushions, each annular pressure cushion being provided with a bore for use in filling the pressure cushion with said liquid, a passage formed in an adjacent said intermediate spacer ring, said bore and said passage being in registry with each other, and said passage being closeable after filling the pressure cushion with said liquid.

2. A joint structure according to claim 1 wherein said intermediate spacer rings are comprised of resilient material.

3. A joint structure according to claim 1 wherein each annular pressure cushion is comprised of resilient steel.

4. A joint structure according to claim 3 wherein said intermediate spacer rings are comprised of resilient material.

5. A joint structure for interconnecting one end of a first pipe to the adjacent end of a second pipe, comprising intermediate connector means, said intermediate connector means comprising a plurality of resiliently deflectable liquid filled force transmitting units, each of said force transmitting units having first and second functional ends, said first functional ends being operatively connected to said one end of said first pipe and said second functional ends being operatively connected to said adjacent end of said second pipe, said resiliently deflectable liquid filled force transmitting units being effective to undergo resilient deflection thereby allowing said first and second pipes to undergo angular motion with respect to each other, each of said units comprises an annular pressure cushion, said annular pressure cushions being axially spaced from each other, a plurality of intermediate spacer rings, said spacer rings being interleaved between adjacent ones of said annular pressure cushions, each annular pressure cushion being provided with a bore for use in filling the pressure cushion with said liquid, and each said bore being closeable to the flow of said liquid therethrough after filling the pressure cushion with said liquid.

6. A joint structure according to claim 5 wherein said intermediate spacer rings are comprised of resilient material.

7. A joint structure according to claim 5 wherein each annular pressure cushion is comprised of resilient steel.

8. A joint structure according to claim 7 wherein said intermediate spacer rings are comprised of resilient material.

* * * * *